(12) United States Patent
Jacobs

(10) Patent No.: US 7,591,411 B2
(45) Date of Patent: Sep. 22, 2009

(54) ANIMAL PROD

(76) Inventor: Jed Jacobs, 2496 N. 2375 E., Hamer, ID (US) 83425

( * ) Notice: Subject to any disclaimer, the term of this patent is extended or adjusted under 35 U.S.C. 154(b) by 36 days.

(21) Appl. No.: 11/903,081

(22) Filed: Sep. 20, 2007

(65) Prior Publication Data

US 2009/0078752 A1    Mar. 26, 2009

(51) Int. Cl.
*B68B 11/00* (2006.01)
(52) U.S. Cl. ......................................................... 231/7
(58) Field of Classification Search ....................... 231/7
See application file for complete search history.

(56) References Cited

U.S. PATENT DOCUMENTS

| 1,140,365 | A | * | 5/1915 | Dixon | 231/7 |
| 2,484,147 | A | * | 10/1949 | Bartel | 231/7 |
| 2,561,122 | A | * | 7/1951 | Juergens | 231/7 |
| 2,981,465 | A | * | 4/1961 | Bartel | 231/7 |
| 4,167,036 | A | | 9/1979 | Kenney | 363/61 |
| 4,394,956 | A | | 7/1983 | Andrews et al. | 231/2 |
| 4,997,127 | A | | 3/1991 | McEwen | 231/7 |
| D364,011 | S | | 11/1995 | Berg et al. | D30/156 |
| D468,066 | S | | 12/2002 | Helms et al. | D30/156 |
| 6,643,114 | B2 | * | 11/2003 | Stethem | 361/232 |
| 6,791,816 | B2 | * | 9/2004 | Stethem | 361/232 |
| 7,174,668 | B2 | * | 2/2007 | Locklear | 43/17.1 |

* cited by examiner

*Primary Examiner*—Thomas Price
(74) *Attorney, Agent, or Firm*—John H. Miller

(57) ABSTRACT

An electrically powered animal prod, particularly for use in motivating larger animals to move in the desired direction, having a flexible shaft is disclosed. The animal prod can also be powered with rechargeable batteries located in the handle and can be recharged without removing the batteries from the handle. The flexible shaft provides for better, more definite contact, longer contact and a more durable animal prod.

20 Claims, 1 Drawing Sheet

ANIMAL PROD

The invention involves an electrically powered animal prod having a flexible shaft.

BACKGROUND

Electrical animal prods are well known. They are used to motivate, usually large animals such as cows, steers, bulls, horses, etc. to move into something that they may not want to move into, such as a chute and holding device for securing the animal while administering medicine or an immunization shot. The electrical current passes through a short distance of the animal's skin only making that spot uncomfortable for a short time, but with no lasting effect or injury, i.e. less irritating than a horsefly bite or bee sting. U.S. Pat. No. 4,167,036 discloses an electrical animal prod having a rigid telescoping rod between the handle and the electrodes. U.S. Pat. No. 4,394,956 discloses a stock prod having a handle with insulation to protect the operator against high voltage and having a switch for shocking the animal. This prod also has a rigid shaft joining the handle and the electrode. U.S. Pat. No. 4,997,127 discloses an electrified livestock controlling device that comprises, a removable electrified prod having a handgrip, an elongated shaft (not described further), a shocking element, a push button switch and a line of well insulated electrical conductors. Some design patents also disclose animal prods such as U.S. Design Pat. Nos. 364,011 and 468,066.

These animal prods appear to have a rigid shaft joining the handle and the electrode(s) for contacting the animal's hide or skin because of the material and structure described and because no mention is made of any degree of flexibility. While a rigid shaft is functional, it can be broken or bent if caught between the animal and a chute or fence, and also is not as effective as really needed because when the animal moves, one of the electrodes can loose effective contact with the animal's hide or skin without the animal having moved far enough or in the desired direction, thus taking more time and work to achieve the desired result.

SUMMARY

It has been discovered that if the shaft of an electrically powered animal prod is made to be within a critical range of flexibility, these shortcomings are overcome and a superior animal prod is produced. The invention includes an electrical animal prod having a flexible shaft joining the handle and the contact(s), electrode(s) for contacting the hide or skin of the animal and for protecting the electrical conductor running between the power source and the contact(s), electrode(s).

The invention also preferably includes an animal prod comprising one or more batteries, preferably a rechargeable type, a handle, preferably comprising the battery or batteries and an activation switch, a flexible shaft attached to the handle and having an electrical conductor in or on the flexible shaft and an end portion opposite the handle, preferably being a U or V shaped element, the end portion comprising two or more spaced apart contacts for contacting the outside of an animal's hide or skin and for passing a safe, but motivating, electrical current along a length of the hide or skin of the animal between the contacts, electrodes.

The animal prod of the invention can also comprise optional features including a hand guard to protect the hand when operating or attempting to operate the animal prod, and to protect against accidental activation of an electrical switch in the handle. It is also preferred that the handle be constructed of electrical resistant material like a plastic, preferably a thermoplastic, but a thermoset plastic is also suitable, a rubber or synthetic rubber or other elastomer.

By flexible shaft is meant a shaft having a flexibility defined as requiring about 6050 grams+/−1210 grams to deflect the shaft 6 inches at a point about 18 inches from a fixed end, i.e. where the shaft is held by the handle, about 2550 grams+/−510 grams to deflect the shaft 6 inches at a point about 24 inches from the fixed end and about 1170 grams+/−234 grams to deflect the shaft 6 inches at a point about 30 inches from the fixed end. More typically the flexibility of the shaft is described as requiring about 6050 grams+/−15% to deflect the shaft 6 inches at a point about 18 inches from a fixed end, where the shaft is held by the handle, about 2550 grams+/−10% to deflect the shaft 6 inches at a point about 24 inches from the fixed end and about 1170 grams+/−15% to deflect the shaft 6 inches at a point about 30 inches from the fixed end. Even more typically the flexibility of the shaft is described as requiring about 6050 grams+/−10% to deflect the shaft 6 inches at a point about 18 inches from a fixed end, where the shaft is held by the handle, about 2550 grams+/−10% to deflect the shaft 6 inches at a point about 24 inches from the fixed end and about 1170 grams+/−10% to deflect the shaft 6 inches at a point about 30 inches from the fixed end. Most typically the flexibility of the shaft is described as requiring about 6050 grams+/−5% to deflect the shaft 6 inches at a point about 18 inches from a fixed end, where the shaft is held by the handle, about 2550 grams+/−5% to deflect the shaft 6 inches at a point about 24 inches from the fixed end and about 1170 grams+/−5% to deflect the shaft 6 inches at a point about 30 inches from the fixed end. In the preferred embodiment the flexibility of the shaft is described as requiring about 6050 grams+/−1-3% to deflect the shaft 6 inches at a point about 18 inches from a fixed end, where the shaft is held by the handle, about 2550 grams+/−1-3% to deflect the shaft 6 inches at a point about 24 inches from the fixed end and about 1170 grams+/−1-3% to deflect the shaft 6 inches at a point about 30 inches from the fixed end. It has been discovered that the flexibility of the shaft is critical to achieving the advantages and superior performance including ease of use, effectiveness and durability of the animal prod of the invention.

Preferably the shaft comprises a fiber reinforced, flexible rod inside a compressible rubber tube, the tube preferably having one or more continuous linear voids contained within the rubber tube. By a flexible rod is meant a rod having a flexibility defined as requiring about 6500 grams+/−1300 grams to deflect the rod 6 inches at a distance of about 18 inches from the fixed end, about 2750 grams+/−550 grams to deflect the rod about 6 inches at a distance about 24 inches from the fixed end and about 1500 grams to deflect the rod about 6 inches at a point about 30 inches from the fixed end. The force required to deflect the rod about 6 inches at various points from the fixed end is higher in this instance than required for the shaft because the rubber tube, held at the fixed end of the shaft, was compressible. The flexibility of the rod, in the invention, can vary from the 6500 grams at 18 inches, from the 2750 grams at 24 inches and the 1500 grams at 30 inches from the fixed end by about +/−1-20 percent, as for the shaft, but typically varies by about +/−15 percent or less, more typically by about +/−10 percent, even more typically by about +/−5 percent and most typically by about +/−1-3 percent.

It is not necessary to use a sheath over the flexible rod, particularly where the rod has one or more linear voids running the length of the rod for containing the wires needed to conduct the electrical current to the electrodes. However, it is preferred to use a flexible sheath, such as an elastomer like rubber, a rubber-like material, thermoplastic urethane, SPANDEX®, or similar material over the rod. The most preferred sheath is a rubber or rubber-like double walled tube having one or more, preferably two or more linear voids running the length of the sheath to carry the electrical conductor wires. The flexible rod, with or without the sheath, typically ranges in length from about 6 inches long to about 6 feet long and the length is normally a matter of choice depending on the type of job to be done.

Other features and advantages of the invention are that the animal prod can be and preferably is water-proof with the handle being sealed where the shaft is held, around the energizing switch and at the cap on the bottom of the handle. Being water proof the animal prod of the invention is safer because the likelihood of the operator being accidentally shocked is minimized or eliminated.

When the word "about" is used herein it is meant that the amount or condition it modifies can vary some beyond that stated so long as the advantages of the invention are realized. Practically, there is rarely the time or resources available to very precisely determine the limits of all the parameters of one's invention because to do so would require an effort far greater than can be justified at the time the invention is being developed to a commercial reality. The skilled artisan understands this and expects that the disclosed results of the invention might extend, at least somewhat, beyond one or more of the limits disclosed. Later, having the benefit of the inventors' disclosure and understanding the inventive concept and embodiments disclosed including the best mode known to the inventor, the inventor and others can, without inventive effort, explore beyond the limits disclosed to determine if the invention is realized beyond those limits and, when embodiments are found to be without any unexpected characteristics, those embodiments are within the meaning of the term "about" as used herein. It is not difficult for the artisan or others to determine whether such an embodiment is either as expected or, because of either a break in the continuity of results or one or more features that are significantly better than reported by the inventor, is surprising and thus an unobvious teaching leading to a further advance in the art.

DETAILED DESCRIPTION OF THE PREFERRED EMBODIMENT AND OPTIONS

Figures 1, 2, 3, 4:
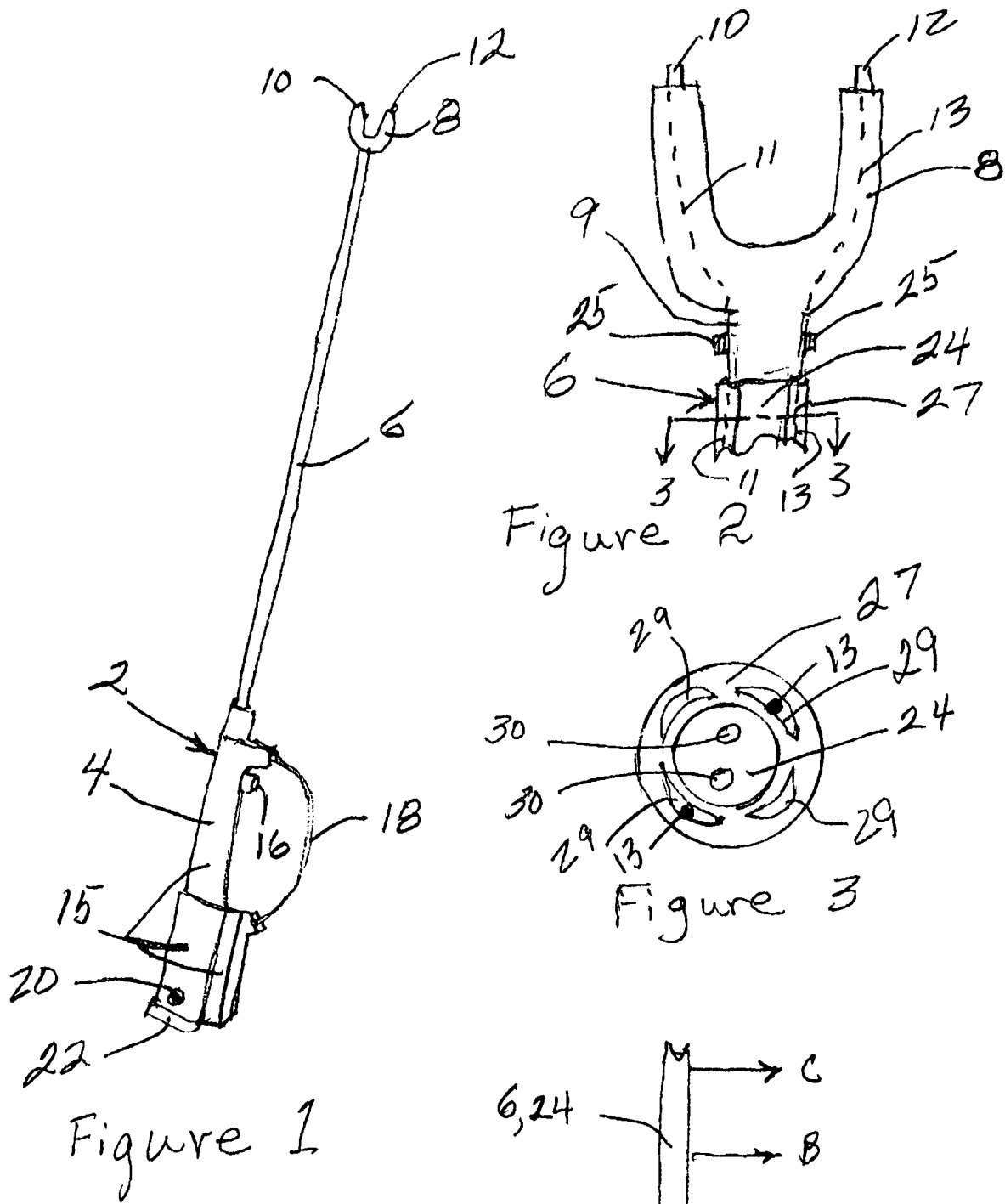
FIG. 1 is a schematic view of a preferred embodiment of the animal prod of the invention.
FIG. 2 is an enlarged front view of an end portion of the animal prod embodiment shown in FIG. 1.
FIG. 3 is an enlarged cross section of the flexible shaft of the preferred embodiment taken along lines 3-3 of FIG. 2.
FIG. 4 is a front view of a test set up used to test the degree of flexibility of the rod and/or shaft used in the animal prod of the invention.

FIG. 1 is a perspective view of a preferred embodiment of the animal prod 2 of the invention and comprises a handle 4, a flexible shaft 6 attached to the handle 4 and an end portion 8 attached to an end of the shaft 6 opposite the end attached to the handle 4, or to an end portion of a component of the shaft 6, the end portion 8 comprising two or more spaced apart electrodes 10, 12 for contacting the outside of an animal's hide or skin and for passing a safe, but motivating, electrical current along a length of the hide or skin of the animal between the electrodes 10,12.

The handle 4 preferably contains one or more batteries (not shown), more preferably rechargeable batteries, in one or more internal compartments 15, an activation switch 16 and an optional hand guard 18. The handle 4 also preferably has a conventional pin outlet 20 for plugging in a conventional socket connector (not shown) on the end of a wire coming from a conventional plug in transformer for recharging the batteries in a known manner used for recharging batteries in other types of devices.

The end portion 8 can be of any reasonable shape to hold the electrodes 10 and 12 spaced apart a conventional distance, such as at least about 0.5 inch to about 1-2 inches or more. In the preferred embodiment shown in FIG. 1, the end portion, fork 8 is Y, U or V shaped, with the two or more spaced apart contactors or electrodes 8 contacting the outside of an animal's hide or skin and for passing a safe, but motivating, electrical current along a length of the hide or skin of the animal between the electrodes. The end portion, fork 8 can be made from any reasonable material strong enough to perform its function and preferably is made of a electrical insulating material like a polymer, rubber or other elastomer, a rubber or elastomer coated spring, a strong wood material like plywood, OSB, and the like. FIG. 2 shows an exploded view of the end portion 8 having a hollow tubular section 9 at the bottom of the Y, and one method of attaching the end portion 8 to the shaft 6, or to a rod 24 using one or more set screws 25 in threaded holes in the tubular section. Instead of the one or more set-screws 25 in threaded holes in the tubular section 9, a suitable adhesive or other conventional securement can be used to secure the flexible rod 24 or flexible shaft 6 into the tubular section 9. Alternatively, the fork 8 need not have the tubular section 9, but instead can have a hole, threaded or unthreaded, in the bottom portion of the fork 8, such as in the bottom of a Y, U, or V shaped fork 8. The flexible rod 24, or flexible shaft 6, can then be threaded or inserted into that hole and secured in any suitable known manner.

In the portion shown in FIG. 2 of the preferred embodiment of the invention, the shaft 6 is comprised of the rod 24 and a sheath 27 surrounding the rod 24. A cross section of the shaft 6 in this preferred embodiment, taken along lines 3-3 in FIG. 2, is shown in FIG. 3. The flexible rod 24, a length of pultruded fiber reinforced polymer material, in this embodiment having a diameter of about 5/16 inch diameter, is surrounded along at least most of its length with a flexible sheath 27, in this embodiment having an outside diameter of about 7/8 inch. The exterior of the cross section of the sheath 27 need not be round, but can also be of another shape such as a square with rounded or generally square corners, rectangles, ovals, etc. As shown in FIG. 3, the sheath 27 preferably has one or more linear voids or channels 29 running through the length of the sheath 27. The sheath 27 shown in FIG. 3 has additional optional voids or channels 29 running through the length. The void(s) or channel(s) 29 in the sheath 27 are not essential, but are helpful in providing a way for running the electrical conductor wires 13 from the power source in the handle 4 to the end portion, fork 8. The electrical conductor wires 13 preferably have an insulating covering but it is not necessary if the sheath 27 and/or the rod 24, in the embodiments where the conductors 11 are in optional channels 30 in the rod 24, is made of an electrically insulating material, which is most typical.

The flexible shaft can be a single rod 24 of various cross sections, preferably a round cross section, containing one or more continuous channels 30 in the interior of the rod and along its length for conductor wires 13 carrying the electrical power to the contactor(s) 10,12. Most preferably the flexible shaft comprises a solid flexible rod 24 having an electrically resistant sheath 27 surrounding the flexible rod 24 as shown in FIGS. 2 and 3.

The flexible rod 24 can be made of any material having the required flexibility in a reasonable size, i.e. reasonable diameter or effective diameter. Typical materials are plastics, rubber, metals like spring steel, fiber reinforced plastics or elastomers including rubber. The sheath 27 should be water proof and durable for the disclosed use and can be any flexible, electrically resistant, durable material such as plastic, rubber, other elastomer, plastic tape and the like. Preferably the sheath is a rubber or rubber like double walled tube with one or more, preferably two or more, linear channels between the double walls for carrying the electrical power to the electrode(s) 10,12. Another embodiment comprises one or more flexible, electrically conductive rods having an electrical resistant sheath surrounding the rod. In such embodiment the rod(s) conduct the power to the electrodes 10,12.

The animal prod of the invention can also comprise optional features including a hand guard to protect the hand when operating or attempting to operate the animal prod, and to protect against accidental activation of an electrical switch 16 in the handle. It is also preferred that the handle be constructed of electrical resistant material like a plastic, preferably a thermoplastic, but a thermoset plastic is also suitable, a rubber or synthetic rubber or other elastomer and have a tight fitting, threaded or locking but removable cap 22 to provide access to the batteries.

By flexible shaft is meant a shaft having a flexibility defined as requiring about 6050 grams+/−1210 grams to deflect the shaft 6 inches at a point about 18 inches from a fixed end, where the shaft is held by the handle, about 2550 grams+/−510 grams to deflect the shaft 6 inches at a point about 24 inches from the fixed end and about 1170 grams+/−234 grams to deflect the shaft 6 inches at a point about 30 inches from the fixed end. More typically the flexibility of the shaft is described as requiring about 6050 grams+/−15% to deflect the shaft 6 inches at a point about 18 inches from a fixed end, where the shaft is held by the handle, about 2550 grams+/−10% to deflect the shaft 6 inches at a point about 24 inches from the fixed end and about 1170 grams+/−15% to deflect the shaft 6 inches at a point about 30 inches from the fixed end. Even more typically the flexibility of the shaft is described as requiring about 6050 grams+/−10% to deflect the shaft 6 inches at a point about 18 inches from a fixed end, where the shaft is held by the handle, about 2550 grams+/−10% to deflect the shaft 6 inches at a point about 24 inches from the fixed end and about 1170 grams+/−10% to deflect the shaft 6 inches at a point about 30 inches from the fixed end. Most typically the flexibility of the shaft is described as requiring about 6050 grams+/−5% to deflect the shaft 6 inches at a point about 18 inches from a fixed end, where the shaft is held by the handle, about 2550 grams+/−5% to deflect the shaft 6 inches at a point about 24 inches from the fixed end and about 1170 grams+/−5% to deflect the shaft 6 inches at a point about 30 inches from the fixed end. In the preferred embodiment the flexibility of the shaft is described as requiring about 6050 grams+/−1-3% to deflect the shaft 6 inches at a point about 18 inches from a fixed end, where the shaft is held by the handle, about 2550 grams+/−1-3% to deflect the shaft 6 inches at a point about 24 inches from the fixed end and about 1170 grams+/−1-3% to deflect the shaft 6 inches at a point about 30 inches from the fixed end. It has been discovered that the flexibility of the shaft is critical to achieving the advantages and superior performance including ease of use, effectiveness and durability of the animal prod of the invention.

Preferably the shaft comprises a fiber reinforced, flexible rod inside a compressible rubber tube, the tube preferably having one or more continuous linear voids contained within the rubber tube. By a flexible rod is meant a rod having a flexibility defined as requiring about 6500 grams+/−1300 grams to deflect the rod 6 inches at a distance of about 18 inches from the fixed end, about 2750 grams+/−550 grams to deflect the rod about 6 inches at a distance about 24 inches from the fixed end and about 1500 grams to deflect the rod about 6 inches at a point about 30 inches from the fixed end. The force required to deflect the rod about 6 inches at various points from the fixed end is higher in this instance than required for the shaft because the rubber tube, held at the fixed end of the shaft, was compressible. The flexibility of the rod, in the invention, can vary from the 6500 grams at 18 inches, from the 2750 grams at 24 inches and the 1500 grams at 30 inches from the fixed end by about +/−1-20 percent, as for the shaft, but typically varies by about +/−15 percent or less, more typically by about +/−10 percent, even more typically by about +/−5 percent and most typically by about +/−1-3 percent.

FIG. 4 shows the set up used to measure the flexibility of the rods and shafts, including the rod 24, and also the shaft 6 in the most preferred embodiment described above. Vice jaws 32 held the rod 24, and later the shaft 6 with the rod 24 surrounded by the sheath 27, in a tight manner. A force was applied to the rod 24 or shaft 6 at various distances along the rod 24 and along the shaft 6 and the magnitude of force required to deflect the rod 24, and the shaft 6, 6 inches from vertical at that distance was recorded. The distance A was 18 inches from the top of the jaws 32, the distance B 24 inches and the distance C was 30 inches from the top of the jaws. The magnitude of forces required to deflect the rod 24 and the shaft 6 in the most preferred embodiment shown in FIGS. 1 and 3 are shown in the following table.

TABLE

| Item | Rod | | | Shaft | | |
|---|---|---|---|---|---|---|
| Distance (inches) | 18 | 24 | 30 | 18 | 24 | 30 |
| Force (grams) | 6500 | 2750 | 1500 | 6050 | 2550 | 1117 |

The advantages of the animal prod of the invention include superior performance in motivating animals in moving in the desired directions, more assured contact with the animal, better durability, far less damaged shafts 6 and the ease, convenience and lower cost of recharging the batteries.

As mentioned above, many variations, alternatives, and equivalents of the various elements of the invention can be made while still using the spirit of the invention, and also many options can be added to accomplish functions such as grading, spraying, mowing, etc. while also using the spirit of the invention. Such embodiments are included within the scope of the claims below.

The invention claimed is:

1. In an electrically powered animal prod comprising a handle containing a source of electrical power and a switch for activating the electrical power, a shaft attached to the handle and an end portion attached to the other end of the shaft opposite the handle, the end portion containing two or more spaced apart contactors protruding from said end portion, contactors that communicate with the electrical power source through the switch to cause a motivating current to flow between the spaced apart contactors when the contactors are placed against the hide or skin of an animal, the improvement comprising a flexible shaft that produces superior performance to rigid shafts including ease of use, effectiveness and durability of the animal prod and wherein said shaft comprises an elastomeric flexible sheath surrounding at least most of the length of a flexible rod, the flexible rod having a flexibility such that a force of about 2750+/−550 grams acting generally perpendicular to the rod at a first point about 24 inches from a fixed, second point on the rod will deflect the rod about 6 inches at said first point.

2. The animal prod of claim 1 wherein the force is 2750 grams +/−15 percent.

3. The animal prod of claim 2 wherein the improvement further comprises rechargeable batteries as the power source and wherein the handle comprises a connection for temporarily plugging in a battery charger.

4. The animal prod of claim 1 wherein the force is 2750 grams +/−10 percent.

5. The animal prod of claim 4 wherein the improvement further comprises rechargeable batteries as the power source and wherein the handle comprises a connection for temporarily plugging in a battery charger.

6. The animal prod of claim 1 wherein the improvement further comprises rechargeable batteries as the power source and wherein the handle comprises a connection for temporarily plugging in a battery charger.

7. The animal prod of claim 1 wherein the sheath is a tube containing one or more linear continuous voids therein.

8. In an electrically powered animal prod comprising a handle containing a source of electrical power and a switch for activating the electrical power, a shaft attached to the handle and an end portion attached to the other end of the shaft, the end portion containing two or more spaced apart contactors protruding from said end portion opposite said other end of the shaft, contactors that communicate with the electrical power source through the switch to cause a motivating current to flow between the spaced apart contactors when the contactors are placed against the hide or skin of an animal the improvement comprising a shaft comprised of a flexible rod surrounded by a flexible, electrically insulating sheath, the sheath being a tube having one or more continuous linear voids contained within the tube for holding one or more electrically conducting wires for communicating between the electrical power source and said contactors and the shaft a having a degree of flexibility as described by requiring a force of about 2550 grams +/−20 percent, acting at a distance of about 24 inches from a fixed location on the shaft, to deflect the shaft about 6 inches at the 24 inch location.

9. The animal prod of claim 8 wherein the force is 2550 grams +/−15 percent.

10. The animal prod of claim 9 wherein the improvement further comprises rechargeable batteries as the power source and wherein the handle comprises a connection for temporarily plugging in a battery charger.

11. The animal prod of claim 8 wherein the force is 2550 grams +/−10 percent.

12. The animal prod of claim 11 wherein the improvement further comprises rechargeable batteries as the power source and wherein the handle comprises a connection for temporarily plugging in a battery charger.

13. The animal prod of claim 8 wherein the improvement further comprises rechargeable batteries as the power source and wherein the handle comprises a connection for temporarily plugging in a battery charger.

14. The animal prod of claim 8 wherein the rod is a fiber reinforced polymer.

15. The animal prod of claim 14 wherein the sheath is made of a rubber or rubber like material.

16. The animal prod of claim 15 wherein the sheath contains one or more linear voids or channels along its length, the voids or channels not reaching an outer peripheral surface of the sheath.

17. The animal prod of claim 8 wherein the rod is a glass fiber reinforced polymer.

18. In a method of using an electrically powered animal prod to move an animal comprising contacting the hide of the animal with spaced apart electrical contactors protruding from an end of the animal prod and energizing the contactors with electrical power, the animal prod comprising a handle containing a source of electrical power and a switch for activating the electrical power, a shaft attached to the handle and an end portion attached to the other end of the shaft, the end portion containing the two or more spaced apart contactors that communicate with the electrical power source through the switch to cause a motivating current to flow between the spaced apart contactors when the contactors are placed against the hide or skin of the animal, the improvement comprising that the shaft is flexible and comprises a flexible rod a having a degree of flexibility as described by requiring a force of about 2750 grams +/−20 percent acting at a distance of about 24 inches from a fixed location on the rod to deflect the rod about 6 inches at the location where the force is applied, and an elastomeric, flexible sheath surrounding said flexible rod.

19. The method of claim 18 wherein the force is 2750 grams +/−15 percent.

20. The method of claim 18 wherein the force is 2750 grams +/−10 percent.

* * * * *